(12) United States Patent
Ranger

(10) Patent No.: US 7,520,380 B2
(45) Date of Patent: Apr. 21, 2009

(54) ACTUATING ASSEMBLY FOR AN ADJUSTABLE WIDTH GUIDEWAY IN A CONVEYOR SYSTEM FOR BOTTLES

(75) Inventor: Michel Ranger, Lachine (CA)

(73) Assignee: Sidel (Canada) Inc., Laval, Quebec (CA)

( * ) Notice: Subject to any disclaimer, the term of this patent is extended or adjusted under 35 U.S.C. 154(b) by 500 days.

(21) Appl. No.: 10/545,907

(22) PCT Filed: Feb. 18, 2004

(86) PCT No.: PCT/CA2004/000226

§ 371 (c)(1),
(2), (4) Date: Aug. 17, 2005

(87) PCT Pub. No.: WO2004/074146

PCT Pub. Date: Sep. 2, 2004

(65) Prior Publication Data

US 2006/0163043 A1    Jul. 27, 2006

Related U.S. Application Data

(60) Provisional application No. 60/447,691, filed on Feb. 19, 2003.

(30) Foreign Application Priority Data

Feb. 18, 2003  (CA) .................................... 2419173

(51) Int. Cl.
*B65G 21/20* (2006.01)
(52) U.S. Cl. ............... 198/861.1; 198/836.1; 198/836.3
(58) Field of Classification Search .............. 198/836.1, 198/836.3, 861.1, 836.4; 406/88; 193/35 C
See application file for complete search history.

(56) References Cited

U.S. PATENT DOCUMENTS

| 1,877,334 A | | 9/1932 | Lathrop et al. |
| 2,901,094 A | | 8/1959 | Jett |
| 3,368,666 A | | 2/1968 | Stone |
| 3,527,336 A | | 9/1970 | Johnston |
| 3,844,405 A | | 10/1974 | Shuford |
| 3,874,497 A | | 4/1975 | Carlson |
| 4,822,214 A | * | 4/1989 | Aidlin et al. ................... 406/86 |
| 5,211,280 A | * | 5/1993 | Houde ...................... 198/836.3 |
| 5,246,314 A | * | 9/1993 | Smith et al. ................... 406/86 |
| 5,291,988 A | * | 3/1994 | Leonard ................... 198/836.3 |

(Continued)

FOREIGN PATENT DOCUMENTS

EP         1 215 146 A1    6/2002

(Continued)

*Primary Examiner*—Gene Crawford
*Assistant Examiner*—William R Harp
(74) *Attorney, Agent, or Firm*—Merchant & Gould P.C.

(57) ABSTRACT

An adjustable width guideway assembly for use in a conveyor for conveying articles having different widths. The assembly comprises a first moveable guide and a second fixed guide parallel to the first guide, the first and second guides defining the guideway therebetween. The first guide is moveable towards or away from the second guide between a first position, a second position and at least one intermediate position The disclosure is particularly directed towards an adjustable width guideway assembly for use in an air conveyor conveying light plastic bottles suspended in the guideway by a flange located on the bottle neck.

16 Claims, 6 Drawing Sheets

U.S. PATENT DOCUMENTS

| | | | |
|---|---|---|---|
| 5,322,160 A * | 6/1994 | Markiewicz et al. | 198/836.3 |
| 5,421,678 A * | 6/1995 | Aidlin et al. | 406/88 |
| 5,437,521 A * | 8/1995 | Ouellette | 406/88 |
| 5,492,218 A * | 2/1996 | Falkowski | 198/836.3 |
| 5,516,239 A * | 5/1996 | Warren et al. | 406/88 |
| 5,542,789 A * | 8/1996 | Aidlin et al. | 406/88 |
| 5,782,339 A | 7/1998 | Drewitz | |
| 5,927,480 A | 7/1999 | McCaffrey et al. | |
| 6,003,662 A * | 12/1999 | McCaffrey et al. | 198/836.3 |
| 6,059,096 A | 5/2000 | Gladieux | |
| 6,135,271 A | 10/2000 | Ledingham | |
| 6,244,429 B1 | 6/2001 | Drewitz et al. | |
| 6,325,733 B1 | 12/2001 | Patterson et al. | |
| 6,378,695 B1 | 4/2002 | Rinne | |
| 6,478,514 B1 | 11/2002 | Ouellette | |
| 6,578,702 B2 * | 6/2003 | Falkowski | 198/575 |
| 6,827,203 B2 * | 12/2004 | Andreoli et al. | 198/836.3 |
| 6,889,823 B2 * | 5/2005 | Delaporte et al. | 198/836.3 |
| 2007/0114112 A1 * | 5/2007 | Guenther | 198/836.3 |

FOREIGN PATENT DOCUMENTS

| | | |
|---|---|---|
| EP | 1 277 677 A1 | 1/2003 |
| WO | WO 00/68122 | 11/2000 |

\* cited by examiner

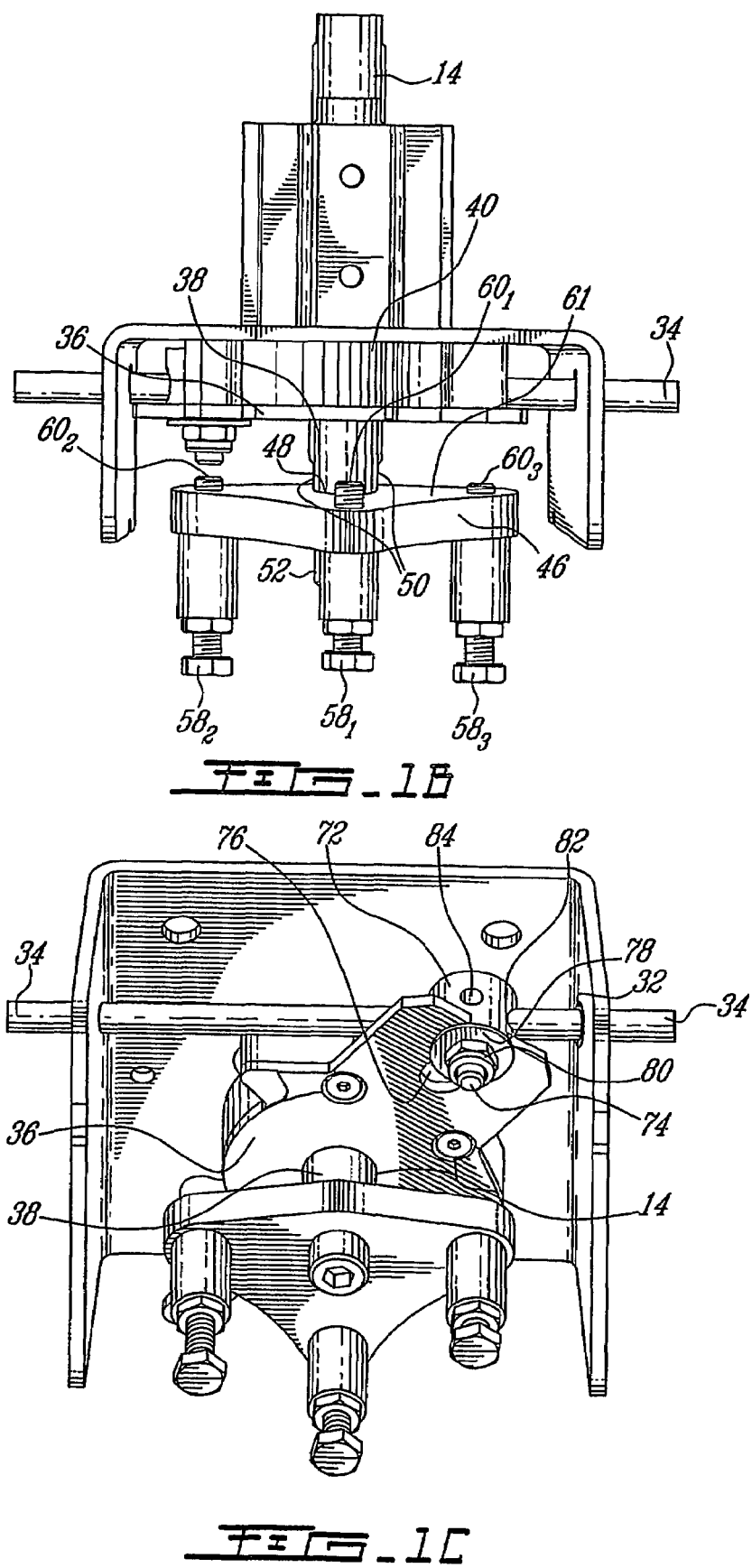

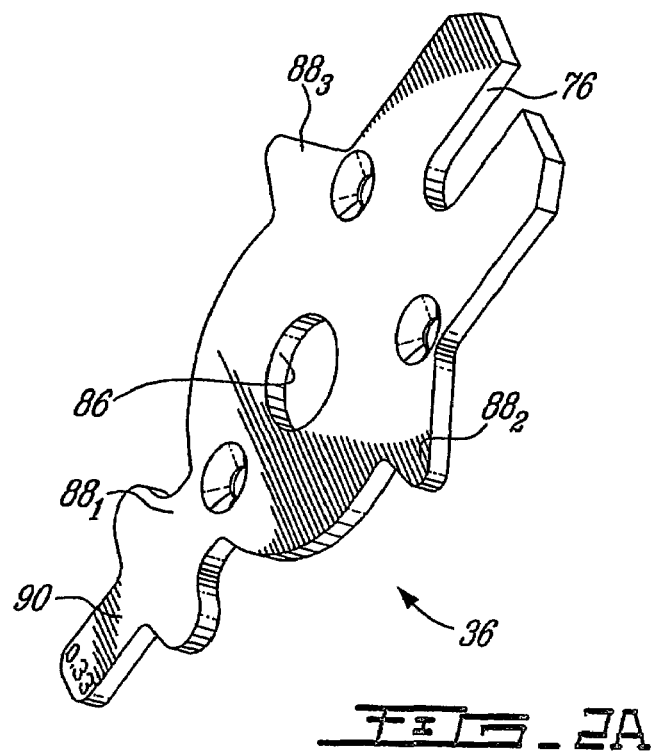
FIG_2A
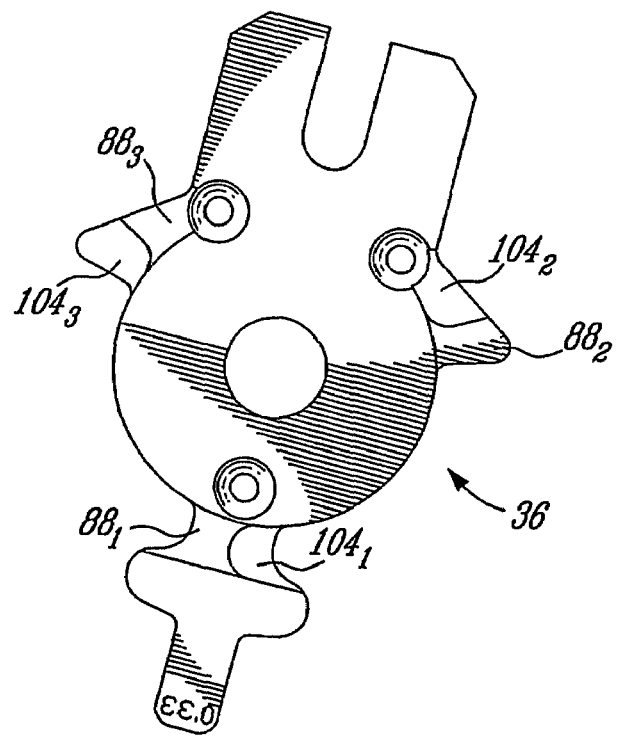
FIG_2B

ACTUATING ASSEMBLY FOR AN ADJUSTABLE WIDTH GUIDEWAY IN A CONVEYOR SYSTEM FOR BOTTLES

CROSS REFERENCE TO RELATED APPLICATIONS

This application claims priority to PCT application No. CA2004/000226 filed on Feb. 18, 2004 and published in English under PCT Article 21(2); in U.S. provisional application No. 60/447,691 filed on Feb. 19, 2003; and in Canadian application No. 2,419,173 filed on Feb. 18, 2003. All documents above are herein incorporated by reference.

FIELD OF THE INVENTION

The present invention relates to assemblies for adjusting the width of guideways in a conveyor system. In particular the present invention relates to an actuating mechanism for adjusting the distance between a pair of opposing guides defining a guideway.

BACKGROUND OF THE INVENTION

Air conveyors are commonly used to convey empty plastic bottles. The bottles are supported between a pair of opposing guides (known as neck guides) by a ring-like flange located between the containers shoulder and the threaded part of the neck. Air is blown in the direction in which the bottles are to be conveyed, usually at the level of the neck, less commonly on the bottle's body. This type of conveyor eliminates the problems associated with container stability. Another advantage is the high speed at which the bottles may be conveyed.

One drawback with such air conveyors arises when bottles with different neck diameters need to be conveyed on the same conveyor. On one hand, if the distance between the guides is too great the diameter of the flange will not be sufficient to hold the bottles in the conveyor. On the other hand, if the distance between the neck guides is too small the bottles will jam.

In order to address the above drawbacks, the prior art reveals conveyor guide systems which increase or decrease the distance between neck guides automatically allowing for different sized bottle necks, typically by means of pneumatic pistons which are fastened to the guides. However, one drawback with these systems is that they typically operate with the piston rod of the pneumatic piston either extended or retracted, thereby only accommodating two sizes of bottle necks. Additionally, fine tuning of the distance between neck guides may be carried out by means of an adjustment screw, but once set no further adjustment is generally possible during operation of the conveyor. This in turn means, for example, that small variations in bottle neck size of bottles of the same capacity, which typically arise between consecutive batches of a production process or bottles from different manufacturers, cannot be taken into account.

SUMMARY OF THE INVENTION

The present invention addresses the above and other drawbacks by disclosing an adjustable width guideway assembly for use in a conveyor for conveying articles having different widths. The assembly comprises a first moveable guide and a second fixed guide parallel to the first guide, the first and second guides defining the guideway therebetween. The first guide is moveable towards or away from the second guide between a first position, a second position and at least one intermediate position.

There is also disclosed an adjustable width guideway assembly for use in a conveyor for conveying articles having different widths. The assembly comprises a first moveable guide and a second moveable guide parallel to the first guide, the first and second guides defining the guideway therebetween, a first series of actuators attached to the first guide, the first series of actuators for moving the first guide towards or away from the second guide between a first position, a second position and at least one intermediate position, and a second series of actuators attached to the second guide, the second series of actuators for moving the second guide towards or away from the first guide between a first position, a second position and at least one intermediate position.

Also, there is disclosed an elongate guideway assembly for use in an air conveyor for conveying articles having a variable width neck portion and suspended in the guideway by a flange immediately above the neck portion. The assembly comprises a first moveable neck guide and a second fixed neck guide parallel to the first neck guide, the first and second neck guides defining a guideway width therebetween. The first guide is moveable towards or away from the second guide such that the guideway width is adjustable between a first width, a second width and at least one intermediate width. In operation, the guideway width is adjusted such that the neck portion of the article being conveyed may move freely therein while remaining retained within the guideway by the flange.

In a particular embodiment, the assembly further comprises a sensor for sensing the width of the neck portion of the articles being conveyed, a series of actuators for moving the first guide towards or away from the second guide between the first position, the second position and the intermediate positions, and a controller, the controller receiving the sensed width from the sensor and controlling the series of actuators such that the guideway width is adjusted to the predetermined width which is larger than and closest to the width of the neck portion.

There is also disclosed and actuating assembly for adjusting a guide. The assembly comprises an actuator, the guide being attached towards a first end of the actuator, the actuator travelling from a disengaged into an engaged position, and a stop mechanism, the stop mechanism adapted to limit the travel to a selected one of at least two selectable positions.

BRIEF DESCRIPTION OF THE FIGURES

FIG. 1B is a bottom view of an actuating assembly in accordance with an illustrative embodiment of the present invention;

FIG. 1C is a raised perspective view of an actuating assembly in accordance with an illustrative embodiment of the present invention;

FIGS. 2A and 2B show elevated views of a striker plate in accordance with an illustrative embodiment and an alternative illustrative embodiment of the present invention;

FIG. 3 is a lowered perspective view of a guideway in accordance with an illustrative embodiment of the present invention;

DETAILED DESCRIPTION OF THE ILLUSTRATIVE EMBODIMENTS

Figure 1A:
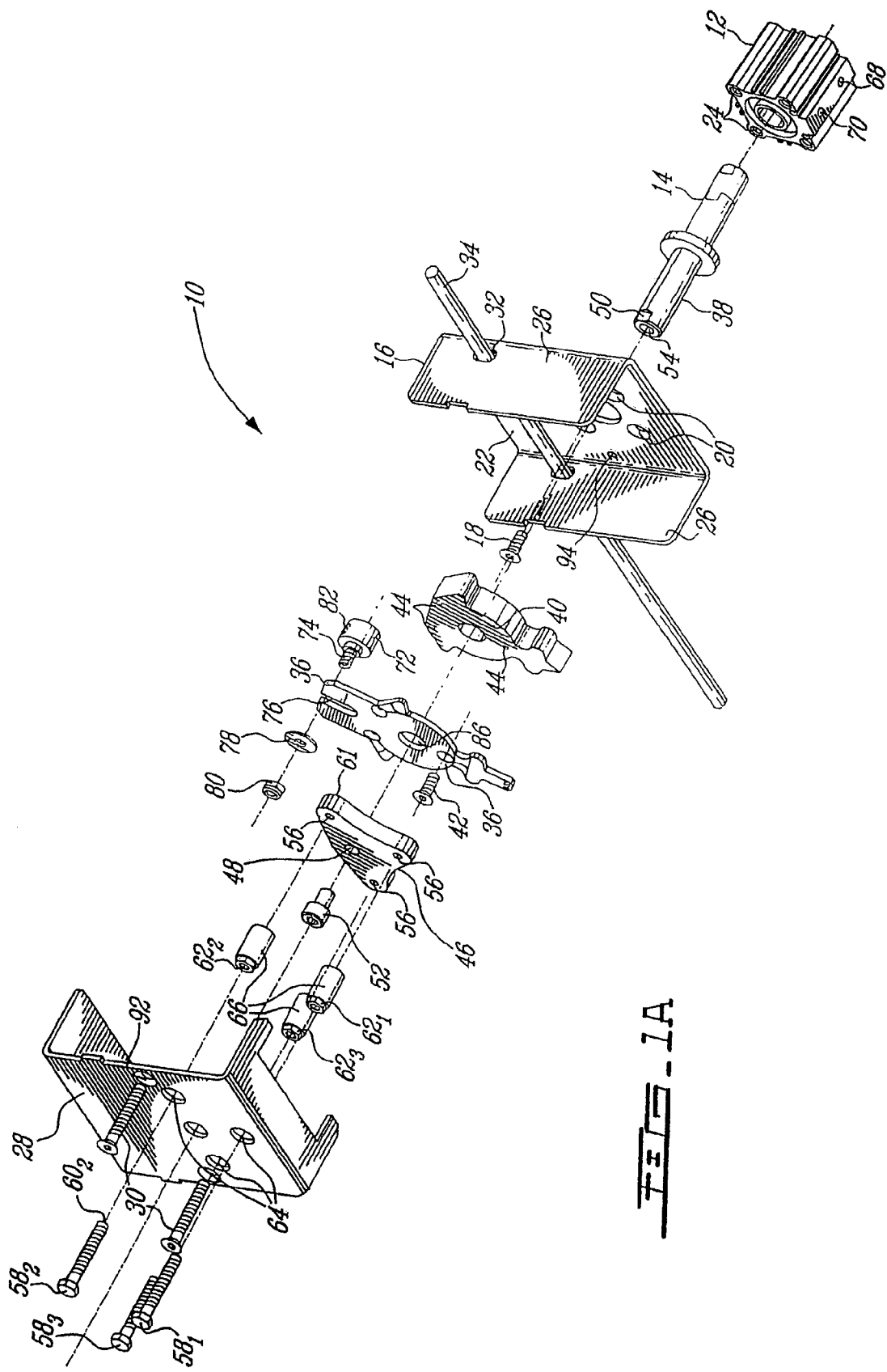
FIG. 1A is an exploded view of an actuating assembly in accordance with an illustrative embodiment of the present invention.
Figure 7:
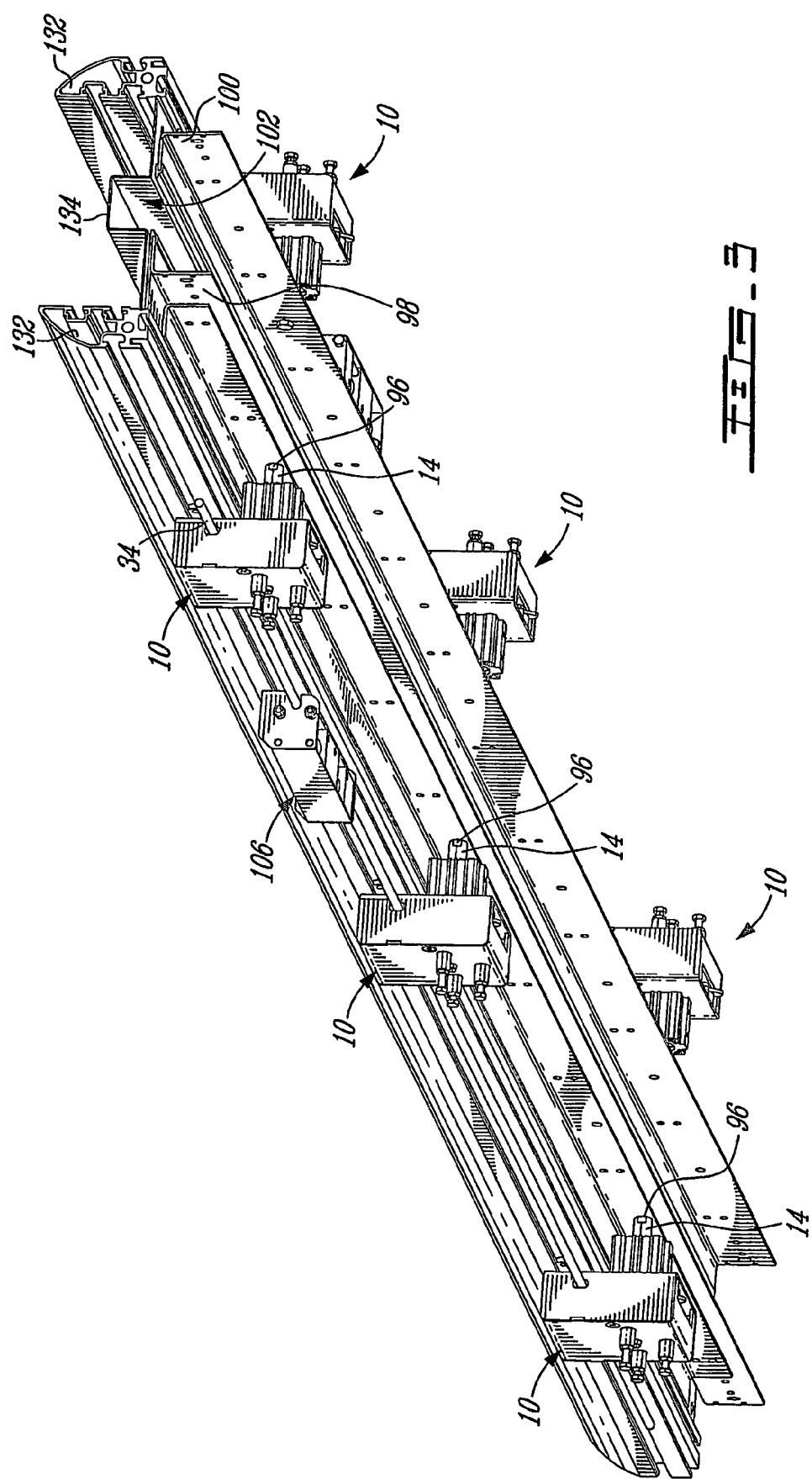

Referring now to FIG. 1A, an illustrative embodiment of an actuating assembly according to the present invention will now be described. The actuating assembly, generally referenced using the numeral 10, comprises a piston housing 12 and a piston rod 14 which moves relative to the piston housing 12 when actuated. In the present illustrative embodiment the piston housing 12/piston rod 14 assembly is pneumatic, although it is within the scope of the invention that other types of actuating assemblies could be used, including electric, for example using a solenoid, hydraulic, etc.. Additionally, in the present illustrative embodiment the piston rod 14 moves between a forward, or engaged, position and a rearward, or disengaged position.

The piston housing 12 is mounted to the assembly base 16 by means of a series of threaded bolts as in 18. The assembly base 16 is manufactured, for example, from a resilient material such as stainless steel and bent or moulded according to well known techniques. The threaded bolts 18 extend through chamfered holes 20 machined in the base plate 22 of the assembly base 16 into threaded receiving holes 24 in the piston housing 12. The threaded bolts 18 are, for example, of the flat head type and of a hex socket or TORX™ drive type such that, on tightening, the threaded bolts 18 lie flush with the inner surface of the base plate 22. The threaded bolts 18 are manufactured, for example, from stainless steel.

In addition to the base plate 22, the assembly base 16 includes two side walls as in 26. On assembly, an assembly cover 28 mates with the assembly base 16 and is secured thereto using a pair of threaded bolts as on 30, thereby providing an enclosure for the majority of moving parts. The assembly cover 28 is manufactured, for example, from a single piece of stainless steel sheet which is bent or moulded according to well known techniques. Holes as in 32 are machined in each side wall 26 thereby allowing passage of a control rod 34 through the enclosure.

A striker plate 36 is mounted over a first end 38 of the piston rod 14 and, although of snug fit, is adapted to rotate freely about the axis of the piston rod 14. A friction reducing plate 40 manufactured from a self lubricating material such as Ultra High Molecular Weight (UHMW) Polyethylene or the like, is fastened to the rear of the striker plate 36 by a series of threaded bolts as in 42 which mate with corresponding machined threaded holes as in 44 in the friction reducing plate 40. As will now be apparent to person of ordinary skill in the art, the friction reducing plate 40 protects the inner surface of the base plate 22, allowing the striker plate 36 to move freely about the first end 38 of the piston rod 14.

Referring to FIG. 1B in addition to FIG. 1A, a collar 46 includes a machined orifice 48 adapted to fit over the chamfered faces as in 50 of the first end 38 of the piston rod 14. The collar 46 is secured to the first end 38 of the piston rod 14 by a threaded bolt 52 which mates with a corresponding threaded hole 54 in the first end 38 of the piston rod 14. A series of threaded holes as in 56 are machined in the collar 46 and adjusting pins or screws $58_1$, $58_2$, and $58_3$ screwed into the holes such that the adjusting screw ends $60_1$, $60_2$, and $60_3$ protrude from the rearward surface 61 of the collar 46. As will now be apparent to a person of ordinary skill in the art, the amount by which the adjusting screw ends $60_1$, $60_2$, and $60_3$ protrude beyond the rearward surface 61 of the collar 46 can be increased or decreased by selectively turning the adjusting screws $58_1$, $58_2$, and $58_3$ clockwise or counter clockwise. Once the amount by which the adjusting screw ends $60_1$, $60_2$, and $60_3$ protrude has been set, lock nuts as in $62_1$, $62_2$, and $62_3$ are provided to secure the setting. Referring back to FIG. 1A, the assembly cover 28 includes a series of holes as in 64 through which the adjusting screws $58_1$, $58_2$, and $58_3$ protrude when the assembly cover 28 is fastened to the assembly base 16. Spacers as in 66 are also provided between the lock nuts as in $62_1$, $62_2$, and $62_3$ and the collar 46 to ensure that the lock nuts as in $62_1$, $62_2$, and $62_3$ can be accessed when the assembly cover 28 is in place.

The piston housing 12 is equipped with a first compressed air inlet 68 and a second compressed air inlet 70. As is well known in the art, application of compressed air to the first compressed air inlet 68 (via a suitable hose and fitting, both not shown) will cause the first end 38 of the piston rod 14 to move away from the piston housing 12. In this case, the travel of the piston rod 14 is limited by the travel of the piston rod within the piston housing 12, or the piston collar 46 striking the assembly cover 28.

Likewise, application of compressed air to the second compressed air inlet 70 will cause the first end 38 of the piston rod 14 to move towards the piston housing 12. In this case, the travel of the piston rod 14 into the engaged position is limited by a stop mechanism, illustratively comprised of one of the adjusting screw ends $60_1$, $60_2$, and $60_3$ striking the striker plate 36.

Referring to FIG. 1C in addition to FIG. 1A, a swivel mechanism 72 having a threaded protrusion 74 is inserted in a slot 76 in the striker plate 36 and secured thereto using a washer 78 and nut 80. The control rod 34 is inserted through a hole 82 in the swivel mechanism 72 and secured in place using a set screw 84. It will now be apparent to a person of ordinary skill in the art that when the control rod 34 is moved forward or backward, a rotational force is brought to bear on the striker plate 36 causing the striker plate 36 to rotate around the first end 38 of the piston rod 14.

Referring now to FIG. 2A, the striker plate 36, which is fabricated, for example, by machining a flat sheet of a resilient material such as stainless steel, includes a pivoting hole 86 machined through the striker plate 36. In an illustrative embodiment the striker plate 36 includes a plurality of striker zones $88_1$, $88_2$, and $88_3$. The striker plate 36 also includes a swivel engaging slot 76 machined in the upper edge thereof and a status paddle 90. Referring back to FIG. 1A, the status paddle 90 protrudes below the actuating assembly 10, thereby providing a visual cue to an operator as to which of the adjusting screws $58_1$, $58_2$, and $58_3$ is currently butting against the striker plate 36.

As discussed above, the assembly cover 28 is attached to the assembly base 16 by means of the pair of threaded bolts as in 30 which are inserted through a set of chamfered holes as in 92 machined in assembly cover 28 and tightened into a corresponding set of threaded holes 94 machined in the base plate 22. The threaded bolts 30 are, for example, of the flat head type and of a hex socket or TORX™ drive type such that, on tightening, the threaded bolts 30 are flush with the assembly cover 28 and manufactured, for example, from stainless steel.

Referring to FIG. 3, the second end 96 of the piston rod 14 is fastened to a neck guide 98 which is free to move with the piston rod 14. The neck guide 98 opposes a second neck guide 100 thereby defining a guideway 102 in between. It will now be apparent to one of ordinary skill in the art that movement of the piston rod 14 is translated into movement of the neck guide 98 in relation to the second neck guide 100 thereby increasing or decreasing the width of the guideway 102. Note that although a straight guideway 102 with straight neck guides 98, 100 is disclosed, adjusting a guideway other than one which are straight could be achieved using the present invention (for example an S shaped guideway, or the like).

Referring back to FIGS. 1A, 1B or 1C, as stated above, the piston rod 14 may be moved between a forward, or engaged, position and a rearward, or disengaged position. When the conveyor (not shown) is in operation, the piston rod 14 is always forward in the engaged position such that one of the adjusting screw ends $60_1$, $60_2$, and $60_3$ is resting against the striker plate 36.

Referring now FIGS. 4A through 4C, the method of operation of the striker plate 36 and collar 46 will be described. As described above, the striker plate 36 is able to pivot about the end of the piston rod. Referring to FIG. 4A, when the striker plate 36 is pivoted such that the swivel engaging slot 76 is immediately above the pivoting hole 86, striker zone $88_1$ is centred over adjusting screw ends $60_1$ which is protruding slightly beyond the back surface of the collar 46. As the collar 46 is securely mounted to the first end 38 of the piston rod (14 in FIG. 1A), when the piston rod 14 is in the forward, or engaged, position, adjusting screw ends $60_1$ will butt against the striker plate 36 in the region of the striker zone $88_1$. It will therefore now be apparent to one of ordinary skill in the art that the distance that the piston rod 14 will need to travel until it is in the forward or engaged position is dependent on the amount by which the adjusting screw ends $60_1$ protrudes beyond the rearward surface 61 of the collar 46, as, at this point, adjusting screw ends $60_2$ and $60_3$ are not in contact with the striker plate 36.

Figure 4C:
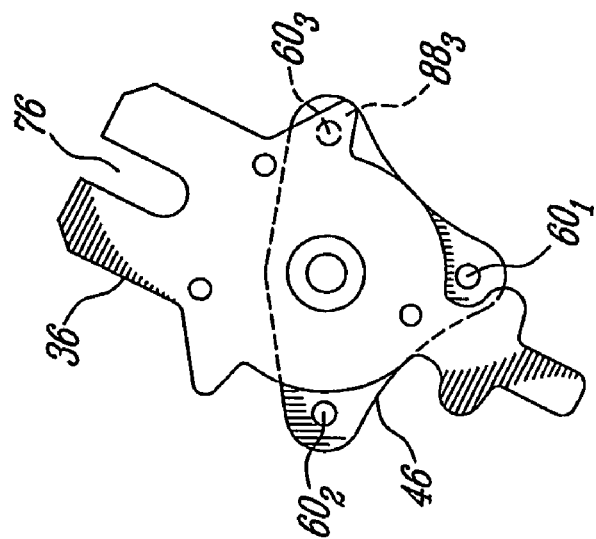
FIGS. 4A through 4C show a rear view of the striker plate and adjustment screw collar in accordance with an illustrative embodiment of the present invention.
Figure 4A:
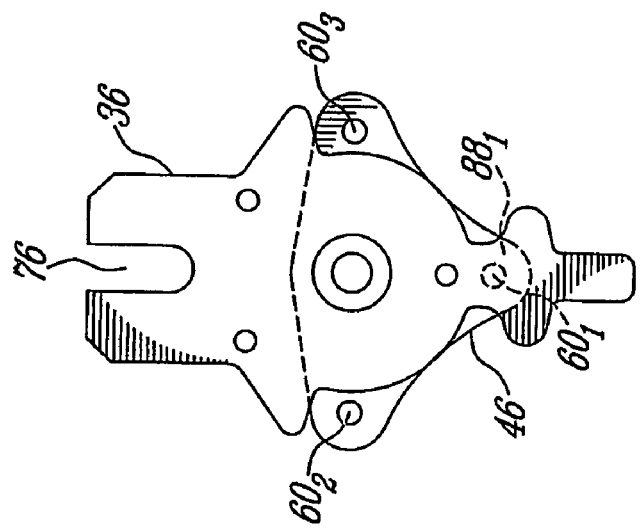
Figure 4B:
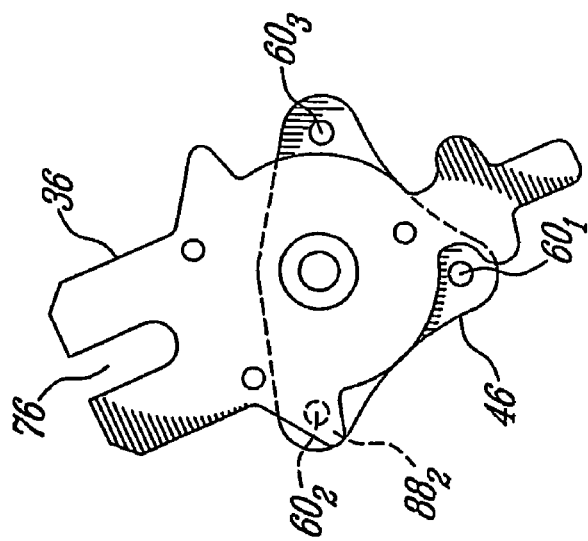

In similar fashion, referring now to FIG. 4B, when the striker plate 36 is positioned such that the swivel engaging slot 76 is to one side of the pivoting hole 86, striker zone $88_2$ is centred over adjusting screw end $60_2$ which is protruding slightly beyond the back surface of the collar 46. With the striker plate 36 in this new position, the distance that the piston rod 14 will need to travel until it is in the forward or engaged position is dependent on the amount by which the adjusting screw end $60_2$ protrudes beyond the rearward surface 61 of the collar 46, as, at this point, adjusting screw ends $60_1$ and $60_3$ are not in contact with the striker plate 36.

Similarly, referring now to FIG. 4C, when the striker plate 36 is positioned such that swivel engaging slot 76 is to the other side of the pivoting hole 86, striker zone $88_3$ is centred over adjusting screw end $60_3$ which is also protruding slightly beyond the back surface of the collar 46. With the striker plate 36 in this new position, the distance that the piston rod 14 will need to travel until it is in the forward or engaged position is dependent on the amount by which the adjusting screw end $60_3$ protrudes beyond the rearward surface 61 of the collar 46, as, at this point, adjusting screw ends $60_1$ and $60_2$ are not in contact with the striker plate 36.

It will now be apparent to one of ordinary skill in the art that by adjusting the adjusting screws $58_1$, $58_2$, and $58_3$ such that the adjusting screw ends $60_1$, $60_2$ and $60_3$ protrude at different heights above the rearward surface 61 of the collar 46, the position of the piston rod 14 when it is in the forward, or engaged, position can be varied, and therefore the width of the guideway (102 in FIG. 3). By providing for actuating assemblies as in 10 attached to both neck guides 98, 100 and carefully selecting the heights by which the adjusting screw ends $60_1$, $60_2$ and $60_3$ protrude above the back surface of the collar 46, a variety of guideway widths 102 can be achieved.

Referring back to FIG. 3, additionally, by interconnecting a series of actuating assemblies 10 using a single control rod 34, the striker plates as in 36 can be repositioned simultaneously thereby allowing a long section of neck guide as in 98, 100 attached to the actuating assemblies 10 to be accurately adjusted.

Still referring to FIG. 3, as explained above, in an air conveyor system with conventional adjustable guides, the usual manner in which the width of the guideway is adjusted is to move both neck guides 98, 100 simultaneously outwards thereby allowing the guideway between two extremes. For example, if the guideway is to be varied between a width to accept bottles with 28 mm necks and a width to accept 38 mm necks then each neck guide must be moved out 5 mm. It will be apparent as well that the same effect could be achieved by moving only one of the neck guides 10 mm. However, by combining the use of two moveable neck guides operating asymmetrically with the actuating assembly of the present invention, a variety of intermediate guideway widths can be achieved.

For example, assume that the adjustment screws of a first actuating assembly attached to a first neck guide are adjusted such that the second adjustment screw is 1 mm higher than the first adjustment screw and the third adjustment screw is 6 mm higher than the first adjustment screw. Assume also that the adjustment screws of a second actuating assembly attached to a second opposing neck guide are adjusted such that the second adjustment screw is 2 mm higher than the first adjustment screw and the third adjustment screw is 4 mm higher than the first adjustment screw. Assuming that the striker plates of the actuating assemblies can be adjusted independently, if both striker plates are positioned such that the first adjustment screws are determining position of the actuating rams when they are in the engaged position, then the width of the guideway will be some value W. If the striker plate of the first actuating assembly is then repositioned such that the second adjustment screw is determining the position of the first actuating ram then the distance between the neck guides will be W+1 mm. Similarly, if the striker plate of the second actuating assembly is then repositioned such that the second adjustment screw is determining the position of the second actuating ram then the distance between the neck guides will be W+1 mm+2 mm=W+3 mm. If the striker plate of the first actuating assembly is then repositioned back to its original position, such that the first adjustment screw is determining the position of the first actuating ram, then the distance between the neck guides will be W+2 mm. Continuing in this manner a variety guideway widths can be achieved in the present illustrative embodiment according to the following table:

| First Guide Actuating Assembly Adjustment Screw # | Second Guide Actuating Assembly Adjustment Screw # | Width of Guideway |
| --- | --- | --- |
| 1 | 1 | W |
| 2 (1 + 1 mm) | 1 | W + 1 mm |
| 1 | 2 (1 + 2 mm) | W + 2 mm |
| 2 (1 + 1 mm) | 2 (1 + 2 mm) | W + 3 mm |
| 1 | 3 (1 + 4 mm) | W + 4 mm |
| 2 (1 + 1 mm) | 3 (1 + 4 mm) | W + 5 mm |
| 3 (1 + 6 mm) | 1 | W + 6 mm |
| 3 (1 + 6 mm) | 2 (1 + 2 mm) | W + 8 mm |
| 3 (1 + 6 mm) | 3 (1 + 4 mm) | W + 10 mm |

Typically the adjustment screws would be so adjusted such that a nominal width guideway is provided for with variations of both increased and decreased width provided for.

Still referring to FIG. 3, note that in order to move the striker plate 36 into a given position using the control rod 34, the piston rod 14 is in the rearward, or disengaged position. Once the striker plate 36 has been positioned, the piston rod 14 is moved into the forward engaged position thereby bringing a given adjusting screw end into contact with the striker plate. Note also that generally a plurality of actuating assemblies as in 10 will be attached to a given section of neck guide 98, 100. The actuating assemblies are controlled in unison via the control rod 34 which extends between adjacent actuating assemblies.

Referring again to FIGS. 4A through 4C, the striker plate 36 is shown in three different operating positions with three (3) adjusting screws $58_1$, $58_2$, and $58_3$ being provided for. However, it will be apparent to one of ordinary skill in the art that a greater or smaller number of adjusting screws could be implemented with appropriate modifications to the striker plate 36 without taking away from the spirit of the invention.

Now referring back to FIG. 2B, a second embodiment of the striker plate 36 will be disclosed. Portions of the striker zones $88_1$, $88_2$, and $88_3$ are precision machined in order to provide a second level as in $104_1$, $104_2$, and $104_3$ to the striker zones $88_1$, $88_2$, and $88_3$, thereby providing for a fine adjustment around a given guideway width. For example, if the depth of the machining is ⅓ mm, by slightly adjusting the position of the striker plate 36 using the control rod 34 such that an adjusting screw end as in $60_1$, $60_2$ and $60_3$ strikes the machined portion $104_1$, $104_2$, and $104_3$ of a striker zone $88_1$, $88_2$, and $88_3$, for example, an additional ⅓ mm can be added to the position of the piston rod 14 when in the engaged position. This in turn will provide for a decrease in the width of the guideway of ⅓ mm. Similarly, if the depth of the machining is ⅔ mm then ⅔ mm can be added to the position of the piston rod 14 when in the engaged position. By providing the striker plates 36 of the actuating assemblies 10 attached to a neck guide on one side of the guideway with a second level of ⅓ mm and the striker plates of the actuating assemblies attached to the neck guide on the other side of the guideway with a second level of ⅔ mm, by asymmetrically adjusting the striker plates the guideway width can be increased in three ⅓ mm steps, thereby providing for a fine adjustment about a given nominal value determined by the adjusting screws $58_1$, $58_2$, and $58_3$.

One advantage of providing the second levels as in $104_1$, $104_2$, and $104_3$ is that the adjusting screws $58_1$, $58_2$, and $58_3$ can be used to pre-set a number of nominal guideway widths 102 and the second levels $104_1$, $104_2$, and $104_3$ used to finely adjust the guideway width around the nominal width.

Figure 5:
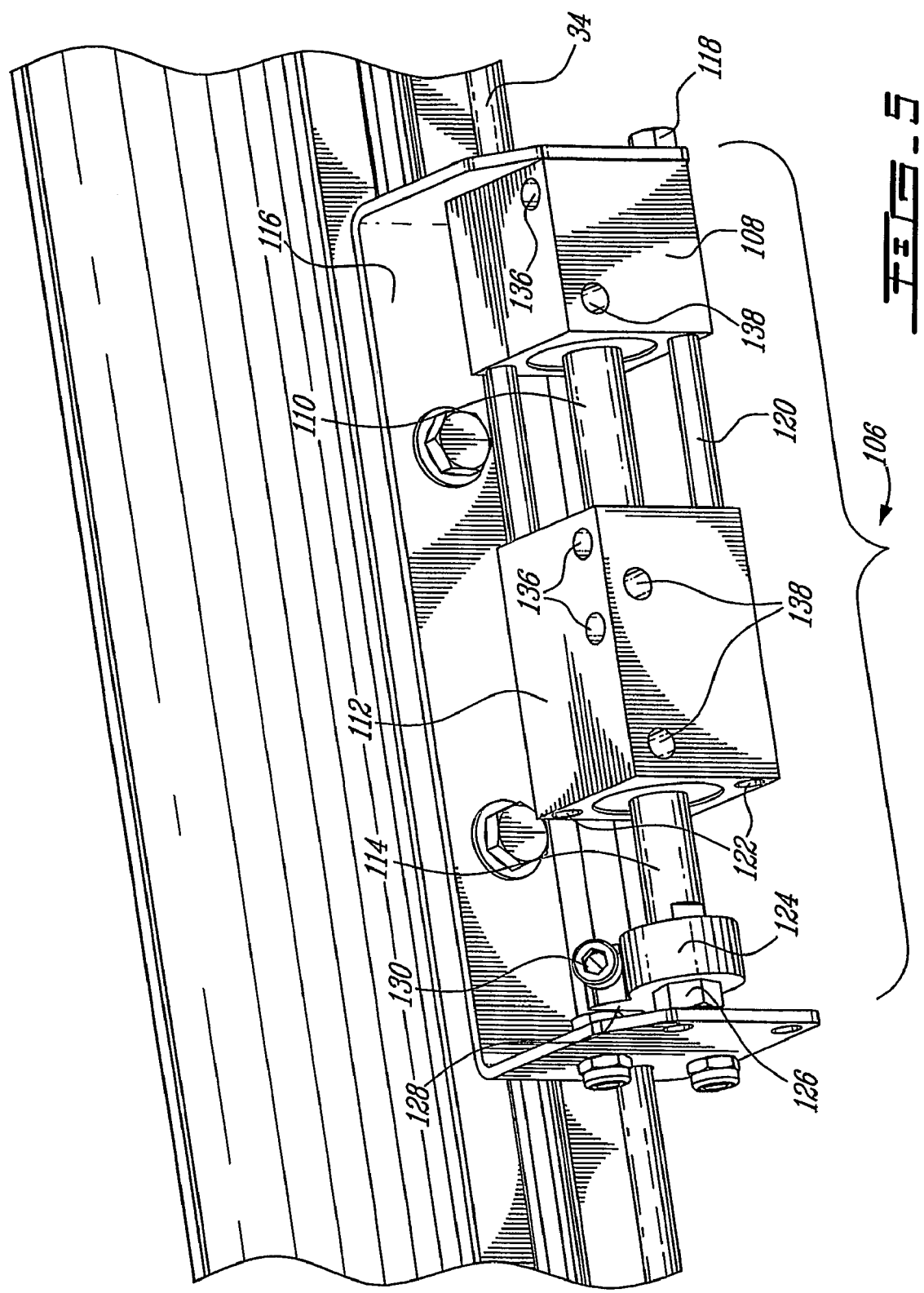
FIG. 5 is an elevated side view of a control rod shifting mechanism in accordance with an illustrative embodiment of the present invention.

Referring now to FIGS. 1A, 1B or 1C, 3 and, in particular, FIG. 5, an illustrative embodiment of a control rod shifting mechanism 106 for shifting the control rod 34 will be described. Illustratively, and in order to provide the multiple positions of the control rod 34 necessary to correctly position the striker plate 36 relative to the adjusting screws $58_1$, $58_2$, and $58_3$, the control rod shifting mechanism 106 is comprised of a first piston housing 108 housing a first piston rod 110, and a second piston housing 112 which houses the first piston rod 110, as well as a second piston rod 114. The first piston housing 108 is securely mounted to a mounting bracket 116 using a pair of threaded bolts as in 118 which mate with corresponding threaded holes (not shown) machined in the first piston housing 108. A pair of posts as in 120 are securely fastened to the first piston housing 108 and are inserted into a pair of corresponding holes as in 122 machined in the second piston housing 112. The holes 122 provide a snug fit for the pair of posts as in 120 while at the same time allowing the second piston housing 112 to slide freely along the posts 120. It will now be apparent to a person of ordinary skill in the art that the second piston housing 112 is able to freely move relative to the first piston housing 108 along a path parallel to the axis of the first piston rod 110 and second piston rod 114.

A fastening assembly 124 is mounted on the end of the second piston rod 114 using a threaded bolt 126 which is inserted and tightened into a corresponding hole (not shown) in the end of the second piston rod 114. The fastening assembly is also secured to the control rod 34, which is inserted into a slot 128 in the fastening assembly 124, by means of a lock nut 130. In this manner, the control rod 34 moves with the second piston rod 114.

Referring back to FIG. 3, the control rod shifting mechanism 106, as well as the actuating assemblies as in 10, are all securely fastened to a pair of longitudinal supports as in 132, fabricated, for example, from aluminum and interconnected by a formed plate 134, fabricated from a rigid material such as stainless steel.

Referring back to FIG. 5, as will be apparent to one of ordinary skill in the art, movement of the piston rods 110, 114 between a fully extended and fully retracted position relative to the piston housings can be achieved by supplying compressed air to the piston housings 108, 112 through a series of air inlets as in 136, 138 (via hose and fitting assemblies, not shown). In this manner, the first piston rod 110 can be moved relative to both the first piston housing 108 and the second piston housing 112. Similarly, the second piston rod 114 can be moved relative to the second piston housing 112. As each piston rod is capable if being in either an extended or retracted position, the control rod shifting mechanism 106 can shift the control rod 34 into one of eight (8) unique positions. As a result, the control rod 34 can be used to rotate the striker plates as in 36, to which it is also attached, to one of eight (8) unique positions (although in the present illustrative embodiment only three unique positions, or six, depending on the configuration, are required).

The above disclosed assemblies are suitable for remote control using a controller (not shown), for example a microcontroller or the like. In particular, a microcontroller can be used which controls the feed of compressed air to the piston housings 12 of the actuating assemblies 10 (see FIG. 1) and the pistons housings 108, 112 the control rod shifting assembly 106 (see FIG. 5). Additionally, in a particular implementation the controller could be combined with a sensor (also not shown) for sensing the widths of articles, in particular the width of the necks of bottles about to enter the guideway, and adjust the width of the guideway accordingly.

Although the present invention has been described hereinabove by way of a preferred embodiment thereof, this embodiment can be modified at will without departing from the spirit and nature of the subject invention.

What is claimed is:

1. An adjustable width guideway assembly for use in a conveyor for conveying articles having different widths, the assembly comprising:

a first moveable guide and a second guide parallel to said first guide, said first and second guides defining the guideway therebetween;

a series of actuators attached to said first guide, each of said actuators including a pneumatic piston traveling between a disengaged position and an engaged position for moving said first guide towards or away from said second guide between a first and second position; and a stop mechanism including a series of moveable striker plates cooperating with said series of actuators for limiting travel of each corresponding piston between at least two selectable positions so as to move said first guide towards or away from said second guide between said first position and said second position and at least one intermediate position;

wherein said stop mechanism comprises at least two adjusting pins mounted to each corresponding actuator, and wherein each striker plate is moveable such that when each corresponding actuator is in said engaged position only one of said adjusting pins is in contact with each striker plate.

2. The assembly of claim 1, wherein a direction of travel from said disengaged position into said engaged position is a substantially straight line and each striker plate is limited to movement laterally to said direction of travel.

3. The assembly of claim 2, wherein each striker plate is rotatable about each corresponding actuator.

4. The assembly of claim 3, wherein said stop mechanism further comprises a controller for selecting one of said at least two selectable positions, said controller comprising a control rod mounted to each striker plate and wherein shifting of said control rod imparts a rotational force to each striker plate.

5. The assembly of claim 4, wherein said control rod is mounted to each striker plate using a swivel mechanism and wherein said control rod shifts laterally to said direction of travel.

6. The assembly of claim 5, wherein said stop mechanism further comprises a control rod shifting mechanism shifting said control rod laterally to said direction of travel.

7. The assembly of claim 6, wherein said control rod shifting mechanism is comprised of three interconnected actuators.

8. The assembly of claim 7, wherein a first of said interconnected actuators has a fixed first end, a second of said interconnected actuators has a first end attached to said control rod, and wherein said third interconnected actuator interconnects the second ends of said first and second interconnected actuators.

9. The assembly of claim 8, wherein said first ends of said interconnected actuators move relative to said second ends in a direction which is lateral to said direction of travel.

10. The assembly of claim 8, wherein the first ends of each of said interconnected actuators travels a distance relative to its second end which is different for each interconnected actuator.

11. The assembly of claim 7, wherein said interconnected actuators comprise interconnected pistons.

12. The assembly of claim 11, wherein said interconnected pistons are pneumatic.

13. The assembly of claim 1, wherein said adjusting pins are mounted in a collar attached towards a second end of each actuator.

14. The assembly of claim 1, wherein said adjusting pins are screws threaded into corresponding tapped holes in said collar.

15. The assembly of claim 1, comprised of three adjusting pins.

16. The assembly of claim 1, wherein said stop mechanism further comprises a controller for selecting one of said at least two selectable positions.

\* \* \* \* \*